W. P. SENG.
OILING DEVICE.
APPLICATION FILED OCT. 10, 1919. RENEWED NOV. 25, 1921.
1,421,583. Patented July 4, 1922.
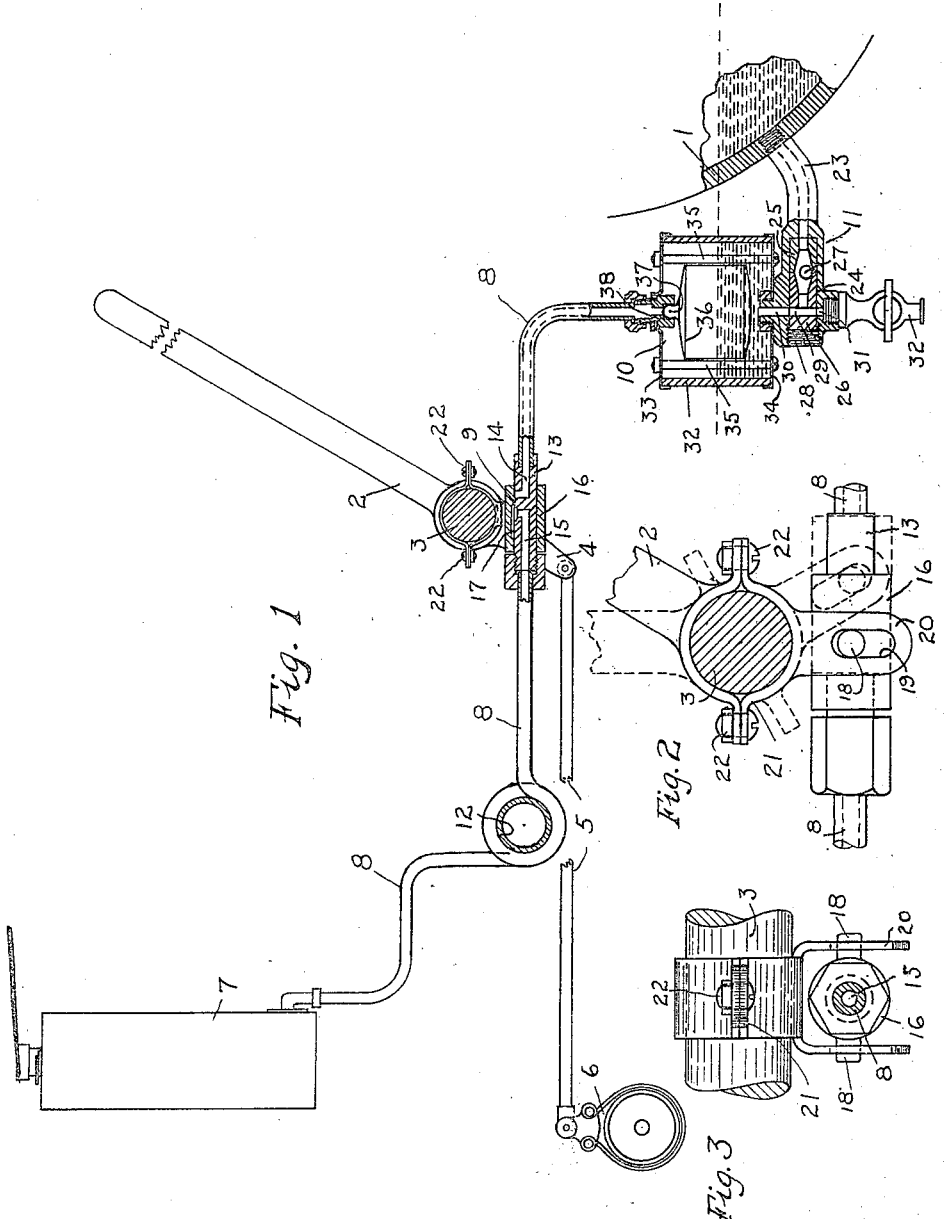

UNITED STATES PATENT OFFICE.

WENDELIN P. SENG, OF CHICAGO, ILLINOIS.

OILING DEVICE.

1,421,583. Specification of Letters Patent. Patented July 4, 1922.

Application filed October 10, 1919, Serial No. 329,836. Renewed November 25, 1921. Serial No. 517,811.

*To all whom it may concern:*

Be it known that I, WENDELIN P. SENG, a citizen of the United States, residing at Chicago, in the county of Cook and State of Illinois, have invented certain new and useful Improvements in Oiling Devices, of which the following is a specification.

This invention relates particularly to the maintenance of a uniform level of oil in the crank case of an engine of the splash oil type, and is particularly designed and intended for use in connection with automobile internal combustion engines, although it may have a more general use wherever applicable. The principal object of this invention is to provide means for preventing the inflow of oil to the crank case of the engine while the automobile is in motion, but automatically admitting the oil to the proper level whenever the car but not necessarily the engine is stopped. Another object of the invention is to prevent the crank case from becoming too full of oil or to prevent the oil from flowing from the crank case when the car is stopped and is standing in an inclined position. Other objects will appear hereinafter.

In the accompanying drawing, Fig. 1 is a view partly in section illustrating the application of this device to the crank case of an engine; Fig. 2 is a detail of one of the valves; and Fig. 3 is another view of the valve shown in Fig. 2.

Devices for maintaining a constant level of oil in the crank case of an engine are subject to the objection that if the admission valve is float controlled the oil from the crank case may back up in the float chamber when the engine is on an incline and may escape from the air admission hole, on top of the float chamber, or the float may become stuck or refuse to operate, admitting more than the desired quantity of oil to the crank case. It is found furthermore, that the proper time to admit oil is when the automobile is stopped and in a substantially level position. The present invention therefore includes an automatically operated valve which closes the oil supply line when the car is stopped in an inclined position, and another valve which is controlled by some operating part of the automobile so that when it is stopped the valve is opened. This insures that the engine will receive an additional supply of oil each time it is needed, when the car is stopped on a level place, whether the engine is running or not.

Referring now more particularly to the drawing, the numeral 1 designates generally the crank case of an automobile engine to which a device of this kind is applied. An automobile is commonly provided with a brake lever 2 mounted on a cross shaft 3 and connected by means of an arm 4 and a rod 5 with a brake 6 in connection with the rear wheels. In one position the brake is applied to stop the car and in the other direction of movement of the lever the brake is released.

The oiling device comprises a reservoir 7, which is connected by means of a pipe line 8 through a valve 9 controlled by the lever 2, through the float device 10 and a ball valve 11, with the crank case 1. If desired, the pipe line may be wrapped about an exhaust pipe 12 of the engine for the well known purpose of making the oil flow more freely.

The valve 9 which is controlled by the lever 2 may be of any desired or suitable construction, as for example that shown in Fig. 1, in which a relatively stationary member 13 which has two opposite end bores 14 and 15 terminating short of each other with lateral outlets, is connected at its ends to sections of the oil pipe line 8. A sleeve 16 which makes a fluid tight connection with the outside of the member 13 covers the lateral ends of the bores 14 and 15, and has a port 17 which connects the lateral extremities of these bores when the sleeve is in one position and disconnects it when the sleeve is in the other position. The sleeve is provided with pins or projections 18 which are engaged in slots 19 of depending ears 20 formed as a part of a clip 21 secured to the shaft 3 by fastening means 22.

Inserted in the crank case is a threaded stem of a fitting 23 which has a bore 24 at the opposite ends in which are inserted oppositely beveled or tapered sleeves 25 and 26 which form a central seat for a ball 27 and are inclined upwardly from their juncture so that the ball when rolled in either direction will close the passage formed by them. The outer member 26 is preferably formed with a threaded head 28 for securing it in the bore 24, and a cross passage 29 therein forms communication between the opposite ends 30 and 31 of a cross passage in the fitting itself, the lower end of which is provided with a cock 32 and the upper end communicates directly with the interior of the float chamber of the float device 10.

This float device comprises a cylinder 32 with a top 33 and a bottom 34 held therein by bolts 35 which constitute a guide for a float 36 within the chamber. Attached to the upper end of the float is a valve 37 which co-operates with a seat 38 attached to a section of the pipe line 8 so that when the float is raised in the float chamber by the height of liquid therein, the valve is pressed against its seat closing the valve chamber and also the interior of the crank case against the admission of any more oil from the source of supply. A threaded stem of the fitting 23 preferably extends through the bottom 34 and is held thereto by a nut.

In operation it is necessary only to fill the receptacle 7 with oil and the device will maintain the proper level of oil in the crank case. When the automobile is stopped the valve 9 will be opened by the movement of the lever 2 to the broken line position and if the car is not resting on an incline, the float 36 will admit oil to the crank case through its float chamber to a proper level. However, if the car is on too great an incline in either direction, the ball 24 will roll on either one of the beveled sleeves until it closes the passageway formed thereby to the passage of oil from the opposite direction. That is, it will not admit any more oil to the crank case from the float chamber when the engine is inclined in one direction and it will not permit the back flow of oil from the crank case when inclined in the other direction.

It is obvious that this device may be applied to any engine or oil using device of the class described, and instead of the valve 9 being operated by a brake lever, it may be controlled by any movable part for operating the engine. Of course it may also be connected to a separate operating lever but by having it controlled by one of the same parts which control the car, the operation of the device may be made dependent upon the stopping of the automobile. It might also be made dependent upon the stopping of the engine in the same way. In either case, oil is automatically added, as required, to the crank case, each time the car is stopped on the level.

I claim:

1. An automobile having a crank case, and a hand operated lever for controlling the car, in combination with a source of oil supply, a float feed adjacent the crank case, and a valve between the float feed and the source of supply operated by the lever for shutting off the supply to the float feed when the automobile is running and for opening it when it is stopped.

2. An automobile engine oil feed comprising a source of supply and a supply line, a float feed, and means in the supply line between the float feed and the engine for closing the supply line against the passage of oil in either direction when the engine is inclined from its normal horizontal position.

3. The combination with an engine having an oil containing crank case, of a float controlled feed therefor, and means intermediate the feed and the crank case for automatically shutting off the oil feed flow therein when the engine is inclined in either direction from its normal horizontal position.

4. The combination with an automobile engine having an oil containing crank case, of a source of oil supply and a supply line therefor, and means in the oil supply line for automatically shutting off the oil line to the passage of oil therein when the engine is inclined in a predetermined amount in either direction longitudinally of the automobile.

5. The combination with an automobile engine, of oil supplying means for the crank case thereof, means for admitting oil to the crank case only when the automobile is stopped, and additional means for closing the oil supply when the automobile is inclined either way in a longitudinal direction.

6. The combination with an automobile having an engine, and a lever to control its operation and to stop it, of a source of oil supply and a supply line for the engine crank case, a float controlled means for maintaining a predetermined level of oil in the crank case, means controlled by said lever for opening the oil supply line to the flow-controlled means only when the automobile is stopped, and additional means between the flow controlled means and the engine crank case for closing the oil supply line when the automobile is inclined in a longitudinal direction.

7. The combination with an automobile engine having an oil containing crank case, and means to control the operation and stopping of the car, of an oil supply including a pipe line for said crank case, a float controlled means for maintaining a predetermined level of oil in the crank case, a valve in the pipe line on one side of the float controlled means which is operated by the said means for opening the pipe line only when the car is stopped, and an automatic valve on the other side of the float controlled means in the pipe line for closing the pipe line from the passage of oil in either direction when the automobile is longitudinally inclined.

8. The combination with a gas engine having an oil containing crank case, of an oil supply including a pipe line thereof, and means in the pipe line for preventing the passage of liquid in either direction therein when the engine is longitudinally inclined in either direction.

9. The combination with a gas engine having an oil containing crank case, of a source of oil supply, float controlling means including a float chamber for maintaining a given level of oil in the crank case, and means between the float chamber and the crank case for preventing the passage of liquid in one direction or the other depending upon the inclination of the engine in the opposite direction.

10. In an oil feeding device, oil supplying means including a pipe line, one portion of which is provided with central bores terminating short of each other and with lateral openings, a ported sleeve member for making and breaking fluid connections between the latter openings, and means for moving the sleeve relatively to that portion containing the lateral opening.

11. In an oil feeding device of the class described, a float chamber comprising a tubular casing, a top and bottom therefor, means for binding the top and bottom at the ends of the casing, an oil supply line extending through the top and forming a valve seat, a float guided by said means and carrying a valve member to co-operate with said seat, and a valve at the bottom of the float chamber which is automatically closed by the inclination of the float device in either direction, said valve including a fitting which projects through the bottom of the float chamber, a pair of tapered sleeves, and a ball normally seated at the juncture of the tapered sleeves and movable upon inclination of the valve a predetermined amount in either direction.

12. In an oil feeding device of the class described, a crank case, a float feeding device therefor, and a fitting connecting the bottom of the float device and the interior of the crank case, said fitting including a substantially horizontal bore communicating at one end with the crank case and laterally with the float chamber, a pair of sleeves oppositely and internally beveled, means holding sleeves in said bores, and a ball normally seated at the juncture of the sleeves to permit free passage of oil, but movable in either direction upon the inclination of the fitting to close communication through the sleeves from the opposite direction.

13. The combination in an automobile, of an engine having a crank case, oil supply means therefor, a valve depending upon the inclination of the automobile for admitting oil to the crank case, another valve in the oil supply means, and a lever to stop the automobile which automatically opens the last named valve when the lever is operated to stop the automobile.

WENDELIN P. SENG.